United States Patent
Polycarpou et al.

(10) Patent No.: US 6,714,386 B1
(45) Date of Patent: Mar. 30, 2004

(54) DISC DRIVE HAVING A SUSPENSION LIMITER FOR IMPROVED SHOCK PERFORMANCE

(75) Inventors: Andreas A. Polycarpou, Champaign, IL (US); David G. Wobbe, Jordan, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/456,766

(22) Filed: Dec. 7, 1999

Related U.S. Application Data
(60) Provisional application No. 60/111,229, filed on Dec. 7, 1998.

(51) Int. Cl.$^7$ .............................. G11B 21/08; G11B 5/55
(52) U.S. Cl. ................................................. 360/265.1
(58) Field of Search ........................ 360/240, 260, 360/264, 264.1, 265.1, 245.7, 244.9, 244.8, 244.2, 244

(56) References Cited

U.S. PATENT DOCUMENTS

| | | | |
|---|---|---|---|
| 3,713,121 A | 1/1973 | Fasano et al. | 360/255.7 |
| 4,843,503 A | 6/1989 | Hazebrouck et al. | 360/246.6 |
| 5,404,636 A | 4/1995 | Stefansky et al. | 29/603.03 |
| 5,422,770 A | 6/1995 | Alt | 360/244.2 |
| 5,801,899 A | 9/1998 | Genheimer | 360/97.01 |
| 5,831,793 A * | 11/1998 | Resh | 360/244.8 |
| 5,856,895 A | 1/1999 | Schaenzer et al. | 360/234.7 |
| 5,864,444 A * | 1/1999 | Baker et al. | 360/265.9 |
| 5,926,347 A * | 7/1999 | Kouhei et al. | 360/254.3 |
| 5,936,803 A | 8/1999 | Berding | 360/244.8 |
| 6,028,745 A * | 2/2000 | Nguyen et al. | 360/254.3 |
| 6,212,044 B1 * | 4/2001 | Murakami et al. | 360/244.9 |
| 6,304,420 B1 * | 10/2001 | Murphy et al. | 360/245.7 |
| 6,341,051 B2 * | 1/2002 | Hachiya et al. | 360/265.1 |
| 6,351,350 B1 * | 2/2002 | Symons et al. | 360/244.9 |
| 2001/0030837 A1 * | 10/2001 | Murphy et al. | 360/244.9 |
| 2003/0189790 A1 * | 10/2003 | Yim et al. | 360/128 |

FOREIGN PATENT DOCUMENTS

| | | | |
|---|---|---|---|
| JP | 10-241310 A | * | 9/1998 |
| JP | 11-66766 | * | 3/1999 |
| JP | 11-213581 A | * | 8/1999 |

* cited by examiner

Primary Examiner—Julie Anne Watko
(74) Attorney, Agent, or Firm—Merchant & Gould P.C.

(57) ABSTRACT

A magnetic disc drive system is disclosed. The disc drive system includes at least one substantially flat magnetic disc, at least one read/write head, at least one head stack assembly, at least one head gimbal assembly, and at least one suspension limiter. The suspension limiter is operatively connected to the head stack assembly. The distal end of the suspension limiter is positioned proximate but normally not in contact with the head gimbal assembly for preventing large head slaps in both operational and nonoperational mode.

22 Claims, 10 Drawing Sheets

DISC DRIVE HAVING A SUSPENSION LIMITER FOR IMPROVED SHOCK PERFORMANCE

RELATED APPLICATIONS

This application claims the benefit of Provisional Application Ser. No. 60/111,229 entitled "Disc Drive Having a Suspension Limiter for Improved Nonoperational and Operational Shock Performance," filed Dec. 7, 1998.

BACKGROUND OF THE INVENTION

This invention relates generally to magnetic disc drives and head gimbal assemblies. Specifically, this invention relates to magnetic disc drives and head gimbal assemblies having a suspension limiter for preventing large head slaps during severe operational and nonoperational shocks.

Modern computers require media in which digital data can be quickly stored and retrieved. Magnetizable (hard) layers on discs have proven to be a reliable media for fast and accurate data storage and retrieval. Disc drives that read data from and write data to hard discs have thus become popular components of computer systems. To access memory locations on a disc, a read/write head (also referred to as a "slider") is positioned slightly above the surface of the disc while the disc rotates beneath the read/write head at an essentially constant velocity. By moving the read/write head radially over the rotating disc, all memory locations on the disc can be accessed. The read/write head is typically referred to as "flying" head because it includes a slider aerodynamically configured to hover above the surface on an air bearing located between the disc and the slider that forms as the disc rotates at high speeds. The air bearing supports the read/write head above the disc surface at a height referred to as the "flying height."

In conventional disc drives, multiple hard discs are coupled to and rotate about a spindle, each disc presenting two substantially flat surfaces for reading and recording. Typically, multiple rotating hard discs are stacked in a parallel relationship with minimal spacing between them. Accordingly, the read/write heads must be designed to move within the narrow space between adjacent discs and fly close to the disc surfaces. To achieve this positional capability, the read/write heads in typical disc drives are coupled to the distal end of thin, arm-like structures called head gimbal assemblies, which are inserted within the narrow space between adjacent discs. These head gimbal assemblies are made of materials and thicknesses as to be somewhat flexible and allow a measure of vertical positioning as the read/write heads hover over the surface of the rotating discs.

Each head gimbal assembly is coupled at its proximal end to a rigid actuator arm that horizontally positions the head gimbal assembly and read/write head over the disc surface. In conventional disc drives, actuator arms are stacked, forming a multi-arm head stack assembly which moves as a unit under the influence of a voice coil motor to simultaneously position all head gimbal assemblies and corresponding read/write heads over the disc surfaces.

Disc drives have two modes, namely operational and nonoperational. The disc drive is in operational mode when the read/write heads (sliders) are in the data zone and the discs are rotating. Nonoperational mode refers to when the disc drive is not operating (i.e. the discs are not rotating).

There are two main types of disc drives: load/unload and contact start/stop disc drives. Load/unload disc drives "park" their read/write heads when the disc drive system is powered down or when the discs temporarily stop spinning so that the read/write heads rest over ramps which are located off the disc (typically outside the outer diameter of the discs). Contact Start/Stop (CSS) disc drives park the read/write heads in a landing zone located on the disc. This landing zone is typically located on the innermost central region of the discs but not over the data portion of the disc.

In conventional disc drive systems, including both types discussed above, the discs rotate at high velocities and read/write heads are positioned over the discs with very little air gap separation. Contact between the read/write head and the discs, known as a head slap, can be catastrophic. Head slaps occur when the disc drive is shocked (e.g. bumped, jarred or otherwise vibrated) either during operational mode when the discs are rotating or during nonoperational mode when the discs are not rotating. When the disc drive is shocked, the read/write head may lift off the surface of the disc and then return to the surface of the disc making contact with the surface of the disc. Because of this, data can be permanently lost, or the read/write heads and discs can be damaged such that the entire disc drive system no longer functions properly. For load/unload and CSS drives, a head slap can occur during operational mode. For CSS drives, a head slap can also occur during nonoperational mode when the discs are not rotating yet the head is still positioned over the disc surface.

The severity of the head slap will determine the extent of the damage to the disc or head. The shock that causes head slap is characterized by shock pulses that the drive is exposed to, typically half sine shape, with a specific duration (e.g. 0.5 ms to 2.0 ms) and a maximum amplitude in gravitational acceleration or g's (acceleration due to gravity). At a constant pulse duration, head slaps are typically getting larger with increasing shock amplitude. For a typical 30 series head gimbal assembly, minor head slaps may be occurring around 200 g (0.5 ms) and larger head slaps and multiple slaps at 200–500 g. Note that in the drive, where multiple head gimbal assemblies are mounted on actuator arms and multiple discs are used, head slaps are typically observed at lower g levels. Severe head slaps are of even more concern in low pre-load suspensions because the g's required to cause a severe head slap are smaller.

One solution that has been found to reduce minor head slaps is to round or radius the corners of the slider instead of using the traditional sharper shaped sliders. This solution has been found to be very effective in reducing and eliminating minor head slaps.

Mechanical latches or stops have been used to reduce non-operational head slap. These stops are not in-situ (part of the head gimbal assembly or head stack assembly) but rather are large mechanical stops attached external to the head gimbal assembly and head stack assembly. These mechanical stops are positioned only to prevent head slap when the head is positioned on its ramp on a load/unload disc drive. In addition to not solving operational head slap, these mechanical stops are large, expensive and unreliable.

Further efforts to reduce media damage caused by head slap have included: decreasing the effective mass of the load beam and slider by decreasing suspension length, width, material thickness, material composition, etc. increasing the pre-load biasing force; and increasing the robustness of the disc surface by using glass substrates, hydrogenated carbon or other tough overcoats, or both. However, under the more stringent requirements of disc drives in more recent times and the desire to build disc drives that can withstand more significant shock, these methods do not prevent head slap from occurring.

SUMMARY OF THE INVENTION

In accordance with this invention the above and other problems have been solved by a head gimbal assembly having a base plate; a load beam having a proximal end and a distal end. The proximal end is connected to the base plate. A gimbal assembly supports a transducer and the gimbal assembly is operatively coupled to the distal end of the load beam. A suspension limiter has a proximal end operatively coupled to the actuator arm, and the suspension limiter is in proximity to but not normally in contact with the load beam. The suspension limiter limits movement of the load beam and transducer in shocked conditions when the load beam comes into contact with the suspension limiter.

In accordance with another aspect of the invention, the suspension limiter is operatively coupled to the actuator arm.

In accordance with another aspect of the invention, a magnetic disc drive has a disc, a head stack assembly, and a plurality of head gimbal assemblies. The head gimbal assemblies are operatively coupled to the actuator arm of the head stack assembly. The head gimbal assemblies of the disc drive include suspension limiters which are operatively coupled to the actuator arm.

DETAILED DESCRIPTION

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
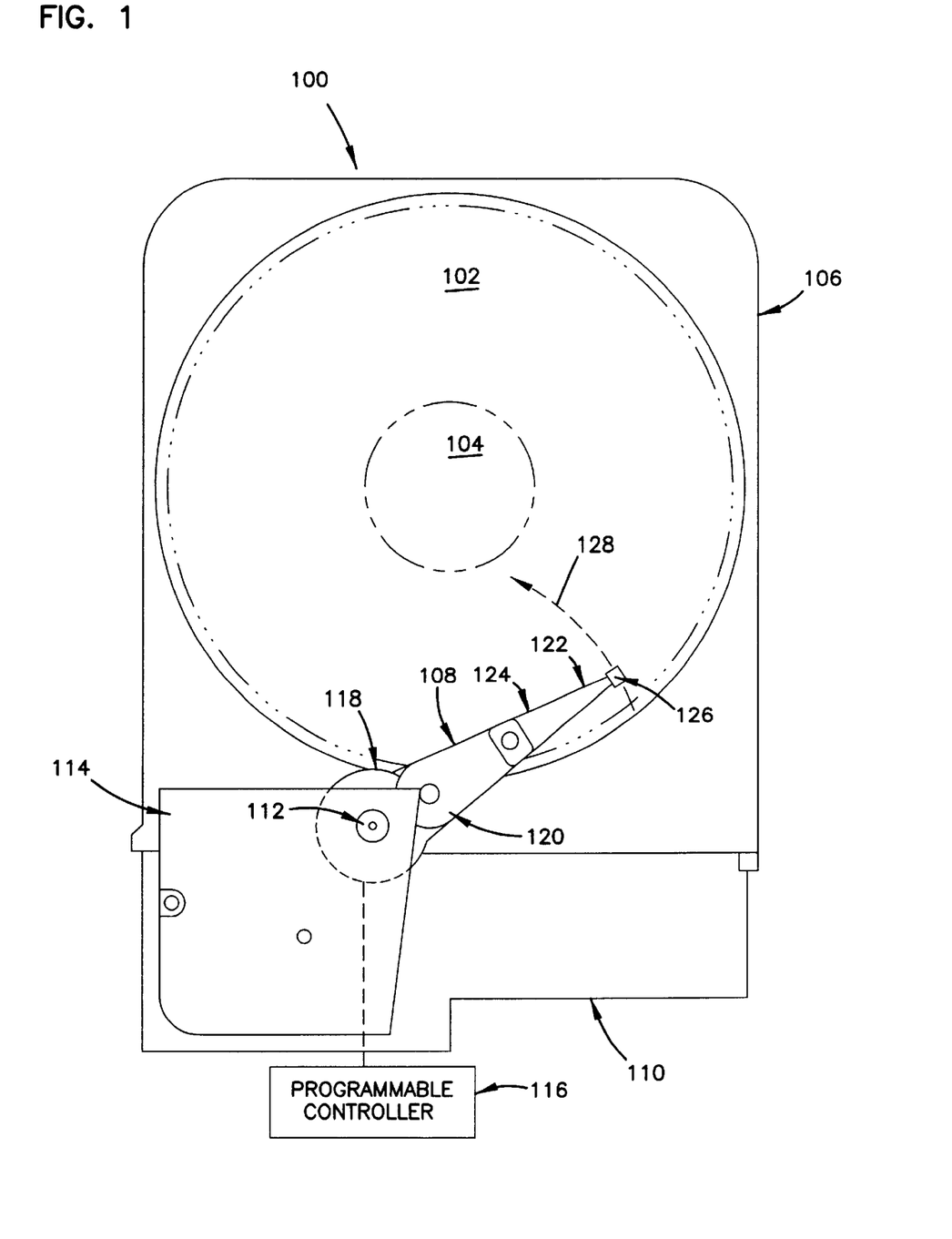
FIG. 1 is a top view of a disc drive.

FIG. 1 is a top view of a disc drive 100. Disc drive 100 includes a magnetic disc 102 mounted for rotational movement about an axis defined by spindle 104 within housing 106. Disc drive 100 also includes a stacked actuator system alternatively referred to as head stack assembly 108 mounted to a base plate 110 of the housing 106 and pivotally movable relative to disc 102 about axis 112. A cover 114 covers a portion of head stack assembly 108. Programmable controller 116 is coupled to head stack assembly 108. In a preferred embodiment, programmable controller 116 is either mountable within disc drive 100 or is located outside of disc drive 100 with suitable connection to head stack assembly 108.

In a preferred embodiment, head stack assembly 108 includes an actuator arm assembly 118, an actuator arm 120, and a head gimbal assembly 122. Head gimbal assembly 122 includes a load beam or flexure arm 124 coupled to actuator arm 120, and a slider 126 coupled by a gimbal assembly (not shown) to load beam 124. Slider 126 supports a transducer for reading information from disc 102 and encoding information on disc 102. When reading and writing data to and from the disc, the head gimbal assembly 122, its associated load beam 124 and slider 126 are positioned over the disc 102. In other words the head gimbal assembly 122 and load beam 124 are preferably situated substantially within the outer radius of the disc 102 during read/write operations.

During operation, programmable controller 116 receives position information indicating a portion of disc 102 to be accessed. Programmable controller 116 receives the position information from the operator, from a host computer or from another suitable controller. Based on the position information, programmable controller 116 provides a position signal to head stack assembly 108. The position signal causes head stack assembly 108 to pivot or rotate about axis 112. This, in turn, causes slider 126 and the transducers mounted on slider 126 to move radially over the surface of the disc 102 in a generally arcuate path as indicated by arrow 128. Once the transducer is properly positioned, programmable controller 116 then executes a desired read or write operation.

Figure 2:
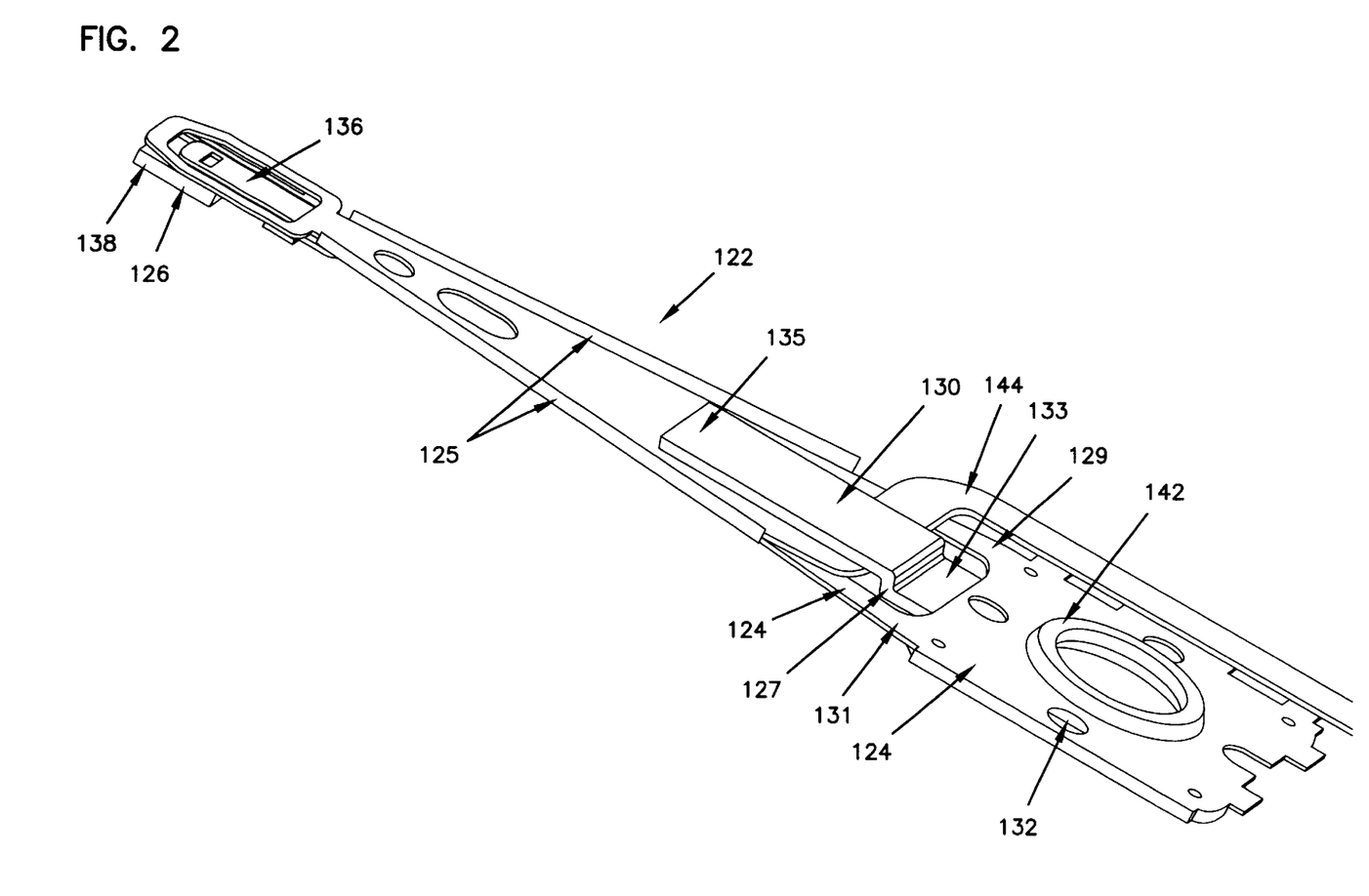
FIG. 2 is a perspective view of a head gimbal assembly according to a preferred embodiment of the invention in which an integral suspension limiter base plate is connected to the same side of the load beam as the transducer.

FIG. 2 is a perspective view of a head gimbal assembly 122 according to a preferred embodiment of the invention. The head gimbal assembly 122 includes a base plate 132 with an integral suspension limiter 130. The base plate 132 includes a swaging boss 142 for connection of the head gimbal assembly 122 to an actuator arm such as arm 120 shown in FIG. 1. of the head stack assembly 108. The base plate 132 is also connected to a proximal end of a load beam 124. The distal end of the load beam 124 supports a gimbal assembly 136. Note that the load beam 124 may include a load beam bent region 125 in which each edge of the load beam 124 is bent to be substantially perpendicular to the rest of the load beam 124. This bent region 125 provides added stiffness in the load beam 124. The gimbal assembly 136 supports a slider 126 which supports transducer 138. Read/write data are transferred between the transducer 138 and the programmable controller 116 via flexible circuit 144, also referred to as flex-on suspension (FOS) 144. It is noted that the transducer 138 is a portion of the slider 126. Preferably the transducer 138 is located near the distal end of the slider 126 (the end furthest from the head stack assembly).

The base plate 132 is located on the same side of the load beam 124 as the transducer 138. It can be seen that the swaging boss 142 of the base plate extends through a hole in the load beam 124 so that the swaging boss 142 can be connected to the actuator arm of the head stack assembly which is located on the side of the load beam 124 opposite the transducer 138. The suspension limiter 130 of this preferred embodiment is an integral part of the base plate 132 of the head gimbal assembly 122.

By the term "integral" it is meant that the suspension limiter 130 and base plate 132 are formed as one unit. Alternatively, they may not be integral, but rather formed as separate components as will be described with reference to FIG. 4.

The suspension limiter 130 has a proximal end 133 nearest the base plate 132 and a distal end 135 furthest from the base plate 132. The suspension limiter 130 includes a double elbow 127 between the proximal end 133 and distal end 135 in which the suspension limiter 130 extends through a space between two arms 129 and 131 of the load beam 124 wherein the suspension limiter 130 changes its position from one side of the load beam 124 to the other side of the load beam 124. There is a slight gap between the suspension limiter 130 and the load beam 124 extending from the double elbow 127 to the distal end 135 of the suspension limiter 130. This slight gap prevents the suspension limiter from interfering with the dynamics of the load beam in the absence of shock.

The suspension limiter 130 may be a variety of dimensions and materials as long as it is less flexible than the load beam 124 itself in the direction perpendicular to and away from the load beam 124. In the embodiment shown in FIG. 2, the suspension limiter 130 is part of the base plate 132 and it may be a single layer material made of the same material and thickness as the base plate 132, preferably stainless steel with a thickness of 6 mils. Alternatively, the suspension limiter 130 can be a ceramic or a multi-layer material such as a viscoelastic. These materials provide improved damping. Therefore, if the load beam 124 and transducer 138 begin to move in a direction away from a surface of disc 102, the suspension limiter 130 minimizes such movement when the load beam 124 makes contact with the suspension limiter 130 at some point or points between the double elbow 127 and the distal end 135. Stopping the movement of the load beam 124 and therefore stopping the movement of the transducer 130 in a direction away from the surface of the disc 102 results from the physical resistance provided by the suspension limiter 130 when the load beam 124 comes into contact with it.

Figure 3:
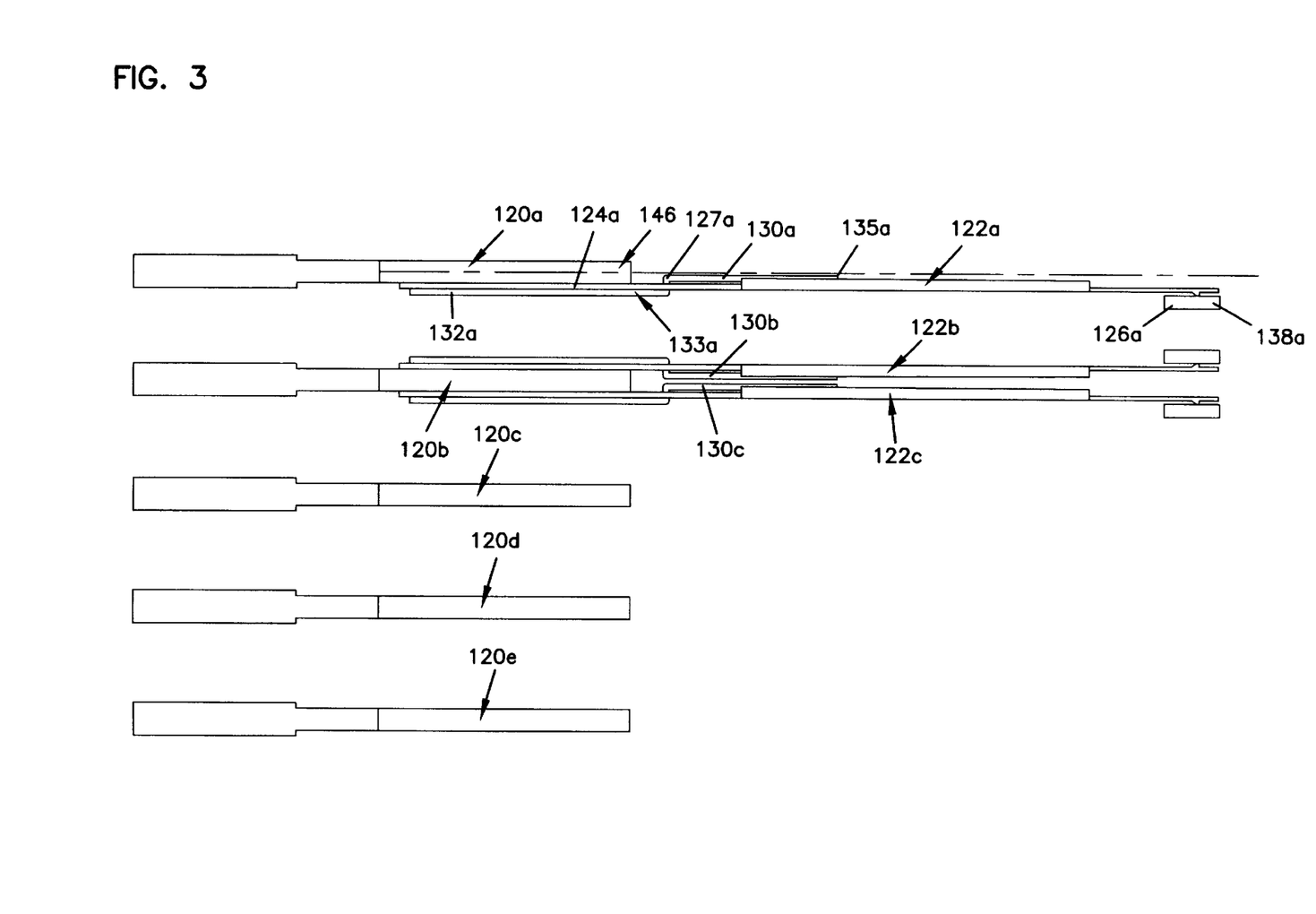
FIG. 3 is a side view of several head gimbal assemblies such as that shown in FIG. 2, connected to actuator arms of a head stack assembly according to preferred embodiments of the invention.

FIG. 3 is a side view of five actuator arms 120a–e with three head gimbal assemblies 122a–c shown attached to actuator arms 120a,b. The head gimbal assemblies 122a–c shown in FIG. 3 are of the same preferred embodiment as discussed above in relation to FIG. 2. Preferably, each actuator arm has two head gimbal assemblies attached to it, one on each side of the actuator arm as shown by activator arm 120b. A magnetic disc (not shown) would be positioned between a pair of head gimbal assemblies 122a and 122b and other discs would be positioned similarly in relation to other pairs of head gimbal assemblies.

The side view shown in FIG. 3 illustrates the positioning and attachment of the suspension limiter 130. The proximal end of the load beam 124a (the end nearest the base plate 132a) is sandwiched between the base plate 132a and the actuator arm 120a. The base plate 132a and load beam 124a are swaged to the actuator arm 120a by the swaging boss 142 (not shown in FIG. 3) of the base plate 132a which extends through the load beam 124a for connection to the actuator arm 120a. In this preferred embodiment, the suspension limiter 130a is an integral part of the base plate 132a. The suspension limiter 130a extends past the end 146 of the actuator arm 120a and includes the double elbow 127a. The portion of the suspension limiter 130a extending from the double elbow 127a to the distal end 135a of the suspension limiter 130a is positioned substantially parallel to the load beam 124a with a small gap between the suspension limiter 130a and the load beam 124a. Under normal operating conditions and normal non-operating conditions (i.e. in the absence of shock), the suspension limiter 130a is not in contact with the load beam 124a. If the disc drive assembly is shocked, and the load beam 124a and slider begin to lift away from the disc, the load beam 124a comes in contact with the suspension limiter 130a. This contact prevents the slider from significantly lifting away from the disc.

Figure 4:
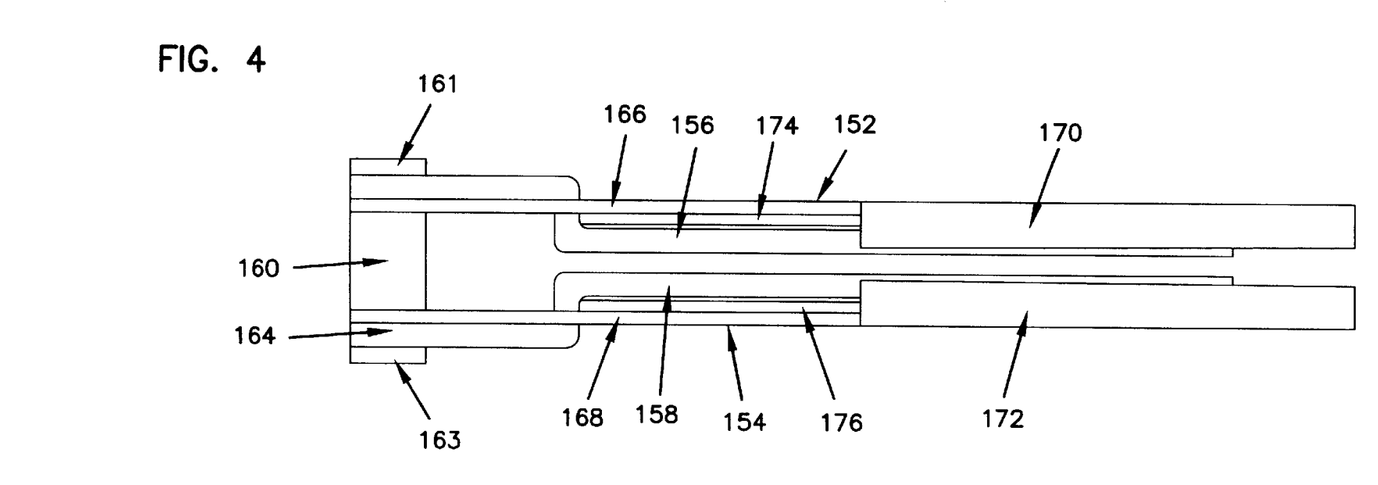
FIG. 4 is a side view of another preferred embodiment of the invention including two head gimbal assemblies in which a suspension limiter is a separate component from the base plate.

FIG. 4 is a close up side view of another preferred embodiment of the invention in which the suspension limiter is not an integral part of the base plate, but rather is a separate component apart from the base plate. This embodiment is designed for drives in which tight tolerance is not required. FIG. 4 shows two head gimbal assemblies 152 and 154 attached to opposite sides of the actuator arm 160. The suspension limiter 156 and load beam 166 are sandwiched between the actuator arm 160 and the base plate 161. A swaging boss (not shown) is used to connect the base plate 161, the suspension limiter 156 and the load beam 166 to the actuator arm 160. Likewise a swaging boss (not shown) is used to connect the base plate 163, suspension limiter 164 and load beam 168 to the actuator arm 160. Portions 170 and 172 of the load beams 166 and 168 shown in FIG. 4 are the portion in which the load beams are bent for added stiffness. The gimbal assemblies and transducers are not shown in FIG. 4. The flex-on suspensions (FOS) 174 and 176 provide for transmission of the read/write data to and from the transducer. There are air gaps 151 and 153 respectively between the load beams 166 and 168 and the respective suspension limiters 156 and 158.

Figure 5:
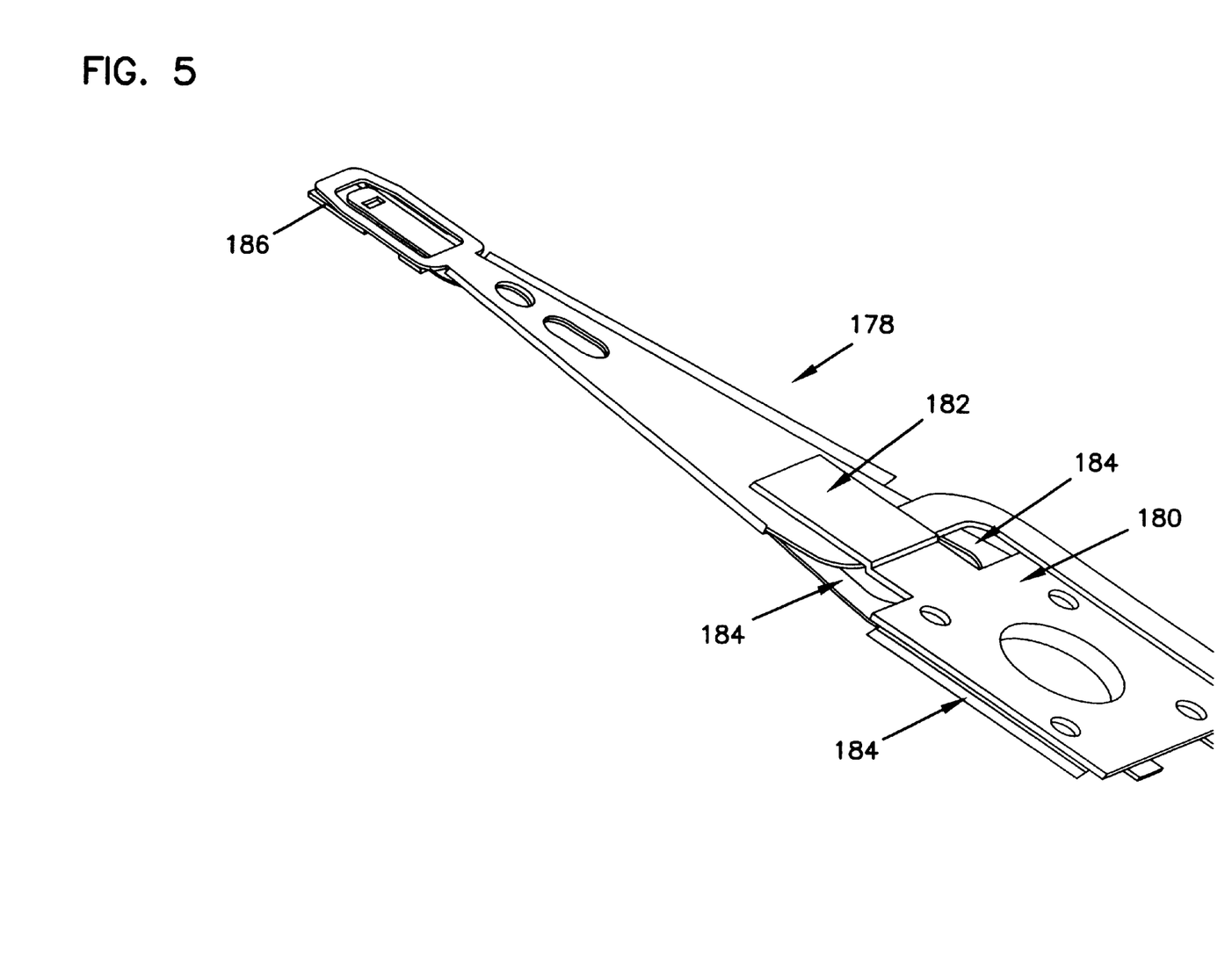
FIG. 5 is a perspective view of a head gimbal assembly according to another preferred embodiment of the invention in which an integral suspension limiter base plate is connected to the opposite side of the load beam as the transducer.

FIG. 5 is a perspective view of another preferred embodiment of the head gimbal assembly 178. In this preferred embodiment the base plate 180 is positioned on the opposite side of the load beam 184 from the transducer 186. Preferably the suspension limiter is integrally connected to the base plate 180, although it may also be a separate component.

Figure 6:
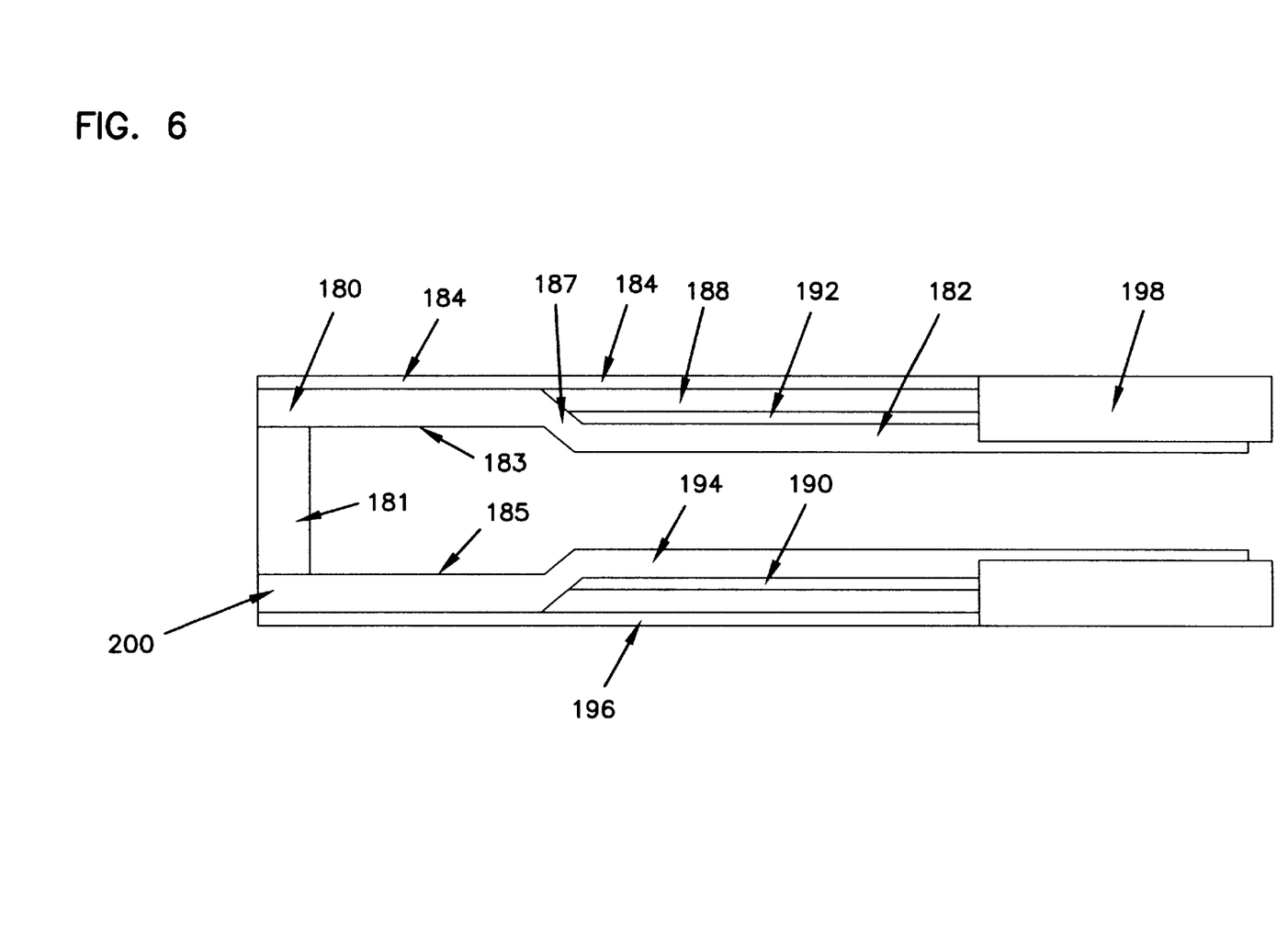
FIG. 6 is a side view of two head gimbal assemblies such as that shown in FIG. 5 connected to an actuator arm.

FIG. 6 is a side view of the preferred embodiment shown in FIG. 5. The actuator arm 181 is connected to two head gimbal assemblies 183 and 185 (only partially shown). With regard to the discussion here, the head gimbal assemblies 183 and 185 are the same. Therefore, the below discussion regarding head gimbal assembly 183 also applies to head gimbal assembly 185.

Base plate 180 is integrally connected with suspension limiter 182. The base plate 180 and load beam 184 are connected to the actuator arm 181 by the use of a swaging boss (not shown). In this preferred embodiment, the base plate 180 is on the opposite side of the load beam 184 from the transducer (not shown). The base plate 180 is directly adjacent to the actuator arm 181 without the load beam 184 sandwiched between the base plate 180 and the actuator arm 181. Load beam 184 includes a load beam bent region 198 in which the edge of the load beam is bent to be substantially perpendicular to the rest of the load beam 184. The head gimbal assembly 183 includes FOS 188 for transmission of read/write data. There is an air gap 192 between FOS 188 and the suspension limiter 182. Note that the suspension limiter 182 angles in a direction away from the load beam 184 at location marked 187 so that there is space for the air gap 192.

When the load beam 184 and transducer (attached to load beam but not shown) are shocked, the load beam 184 and transducer will begin to lift away from the surface of the magnetic disc. When the load beam 184 makes contact with the suspension limiter 182 severe head slap is prevented because the transducer is not allowed to move any further away from the magnetic disc. In the case of head gimbal assembly 185, the load beam is shown at 196, the base plate is at 200, the suspension limiter is at 194 and an air gap at 190.

Figure 7:
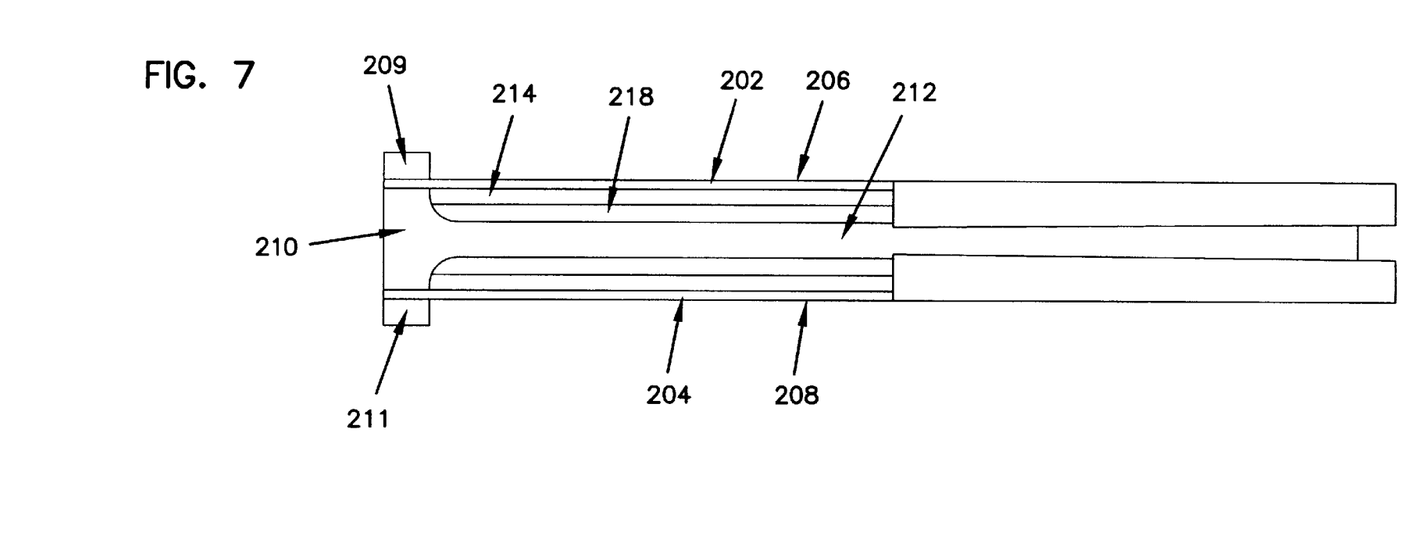
FIG. 7 is a side view of a two head gimbal assemblies attached to an actuator arm having an extension that serves as a suspension limiter for both head gimbal assemblies according to a preferred embodiment of the invention.

Another preferred embodiment of the invention in which the suspension limiter is an extension of the actuator arm is shown in FIG. 7. Load beams 202 and 204 of head gimbal assemblies 206 and 208 are connected to the actuator arm 210 via a swaging boss (not shown) and base plates 209 and 211. The actuator arm is integrally connected to an actuator extension 212 also referred to as suspension limiter 212. This suspension limiter 212 and actuator arm 210 are integral and manufactured as one piece. Alternatively, the suspension limiter 212 and actuator arm 210 may be manufactured as separate pieces. In this embodiment there is only one suspension limiter 212 per two head gimbal assemblies 206 and 208. The head gimbal assembly 206 includes a FOS 214 for transmission of read/write data. There is an air gap 218 between the load beam 202 and the suspension limiter 212.

Note that the actuator arm extension 212 (i.e. suspension limiter 212) has a smaller cross sectional thickness than the actuator arm 210. In this way the suspension limiter 212 can fit between the two head gimbal assemblies 206 and 208. Preferably, the actuator arm extension 212 should be the same or smaller cross sectional thickness as the actuator arm 210.

The suspension limiter 212 operates similarly to the suspension limiters of the other described preferred embodiments. As the load beams 202 and 204 move in a direction toward the suspension limiter 212, and hence away from the magnetic disc, the physical contact between the load beam 202 and suspension limiter 212 will eventually stop such movement and hence reduce the occurrence of head slap.

Figure 8:
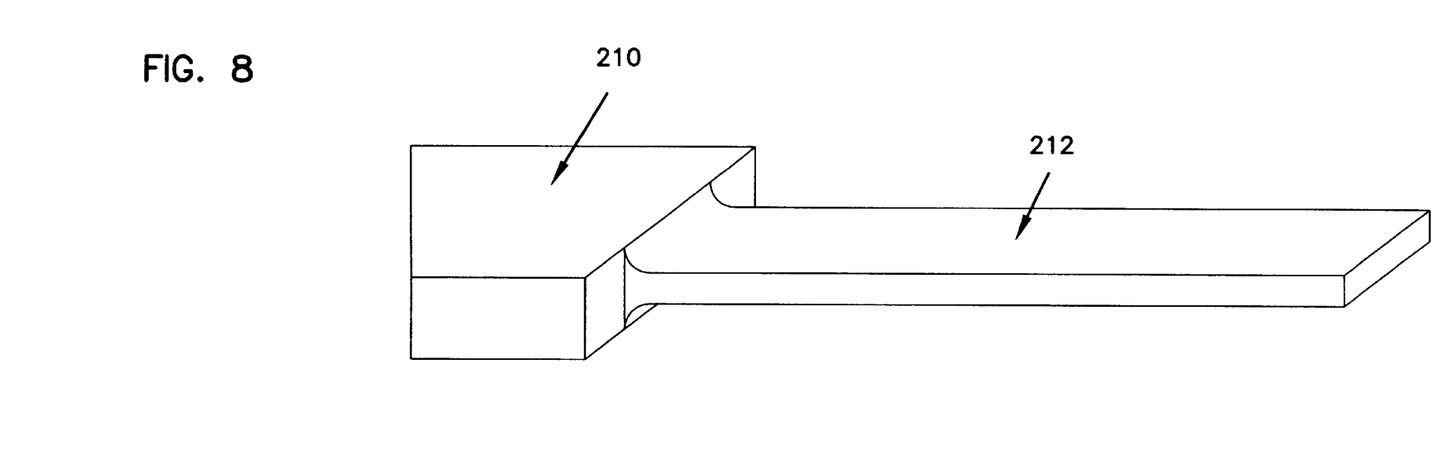
FIG. 8 is a perspective view of the actuator arm shown in FIG. 7.

FIG. 8 is a perspective view of the actuator arm 210 and suspension limiter 212 shown in FIG. 7 and discussed above. As can be seen from FIG. 8, a preferred embodiment includes a suspension limiter 212 which is not as wide (in the direction perpendicular to the thickness discussed above with respect to FIG. 7) as the actuator arm 210. The purpose for this difference in width between the actuator arm 210 and the suspension limiter 212 is to minimize the inertia of the head stack assembly so that the head stack assembly and connected head gimbal assemblies can be moved quickly during operation for quick access to data on the disc.

Figure 9:
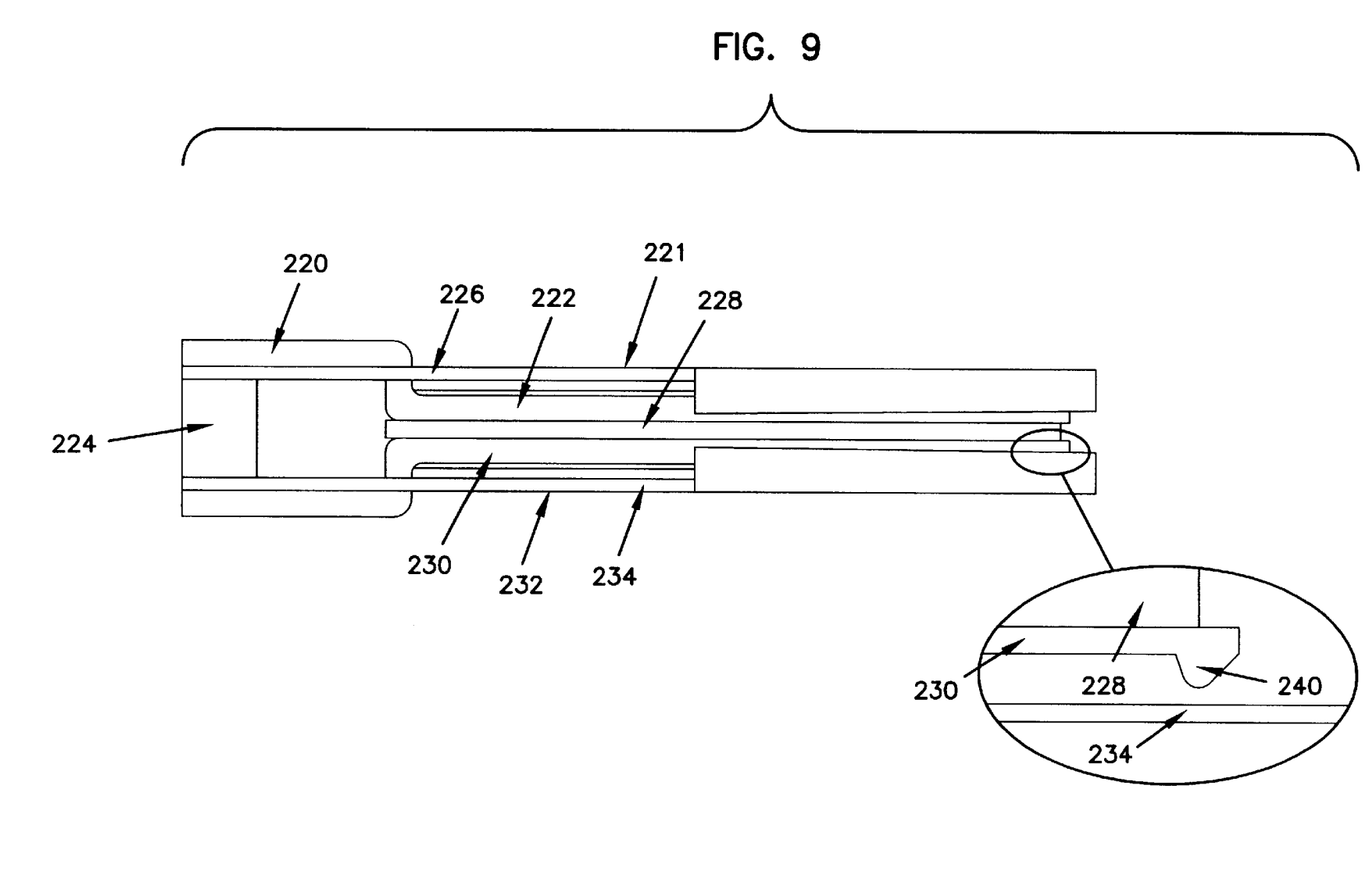
FIG. 9 is a side view of another preferred embodiment of the invention in which an energy absorbing layer is positioned between adjacent suspension limiters of two head gimbal assemblies. A side enlarged view of an alternative preferred embodiment of the invention in which a suspension limiter has a bump on its end is also shown.

FIG. 9 is a side view of another preferred embodiment of the invention. In this preferred embodiment, the base plate 220 and suspension limiter 222 of head gimbal assembly 221 are integrally connected. At the point where the base plate 220 is connected to the actuator arm 224, the base plate 220 is on the same side of the load beam 226 as the transducer (not shown). In this respect this embodiment is similar to the embodiment shown in FIGS. 2–3. However, this preferred embodiment also includes an energy absorbing layer 228 between the suspension limiter 222 of head gimbal assembly 221 and the suspension limiter 230 of the adjacent head gimbal assembly 232. The purpose of the energy absorbing layer 228 is to absorb the energy imparted from the load beam 226 when it contacts the suspension limiter 222 and likewise when the load beam 234 contacts suspension limiter 230.

The energy absorbing layer 228 can be any material that provides high damping. For example, a polymeric material such as polyemide or parylene may be used for energy absorbing layer 228. The energy absorbing layer 228 is attached to the two suspension limiters 222 and 230 by a glue or an adhesive.

Another preferred embodiment of the invention shown in the side enlarged view of FIG. 9 includes a compliant or noncompliant bump 240 located on the suspension limiter 230 at the contact point with the load beam. The bump is provided to add further shock absorption, change boundary conditions during impact and reduce the amount of wear debris. The bump 240 may be any rounded shape that extends out from the suspension limiter 230 toward the load beam 234. Despite the inclusion of the bump 240 in the expanded portion of FIG. 9, it is also possible to utilize the energy absorbing layer 228 without the bump 240. Alternately, it is also possible to use the bump 240 without including the energy absorbing layer 228 in any specific preferred embodiment previously described.

It should be noted that different designs and configurations of the suspension limiters of this invention can be made to achieve a desired stiffness and damping. High damping is desired for absorbing and dissipating shock energy. Through elementary modeling it was determined that a suspension limiter (modeled as a simple beam) having a thickness of about 6 mil which is about two orders of magnitude larger than the stiffness of the load beam would limit large load beam vibrations.

Figure 10:
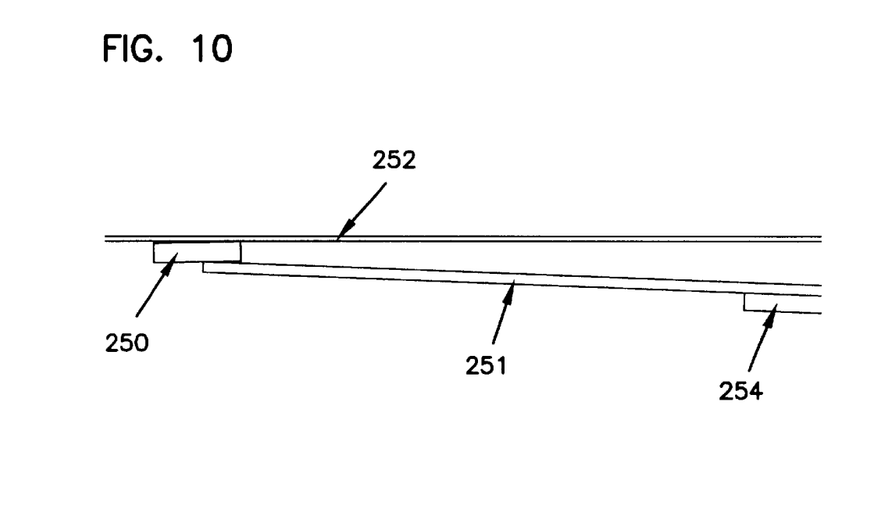
FIG. 10 is a side view taken from a photographic image (using a high speed camera) of a head gimbal assembly slider in contact with a disc when a suspension limiter is used according to the invention.

Some limiters were built with a thickness of 6 mil and attached to single head gimbal assemblies and shocked under nonoperational shocks. The experiments were also repeated with the same head gimbal assemblies but without the limiters attached. FIG. 10 is a side view taken from a photographic image (using a high speed camera) of a head gimbal assembly including a load beam 251 connected to a slider 250 in contact with a disc 252 when a suspension limiter 254 is used.

Figure 11A:
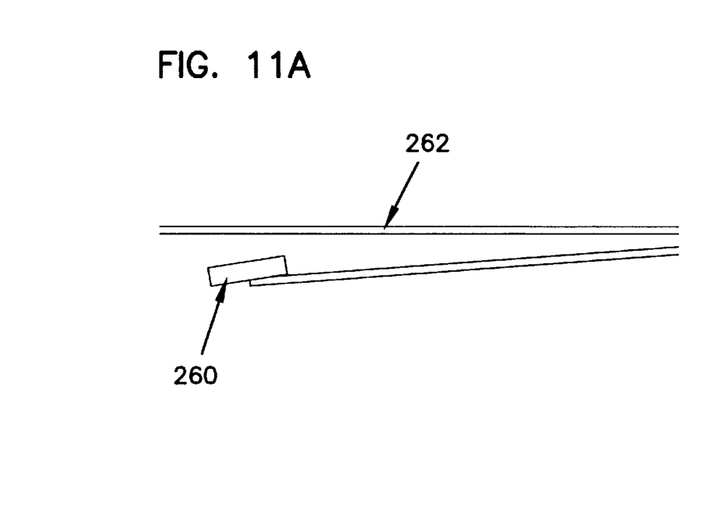
FIGS. 11a–b is a side view showing the results (taken from a high speed camera) of: (a) a shock on a head gimbal assembly without a suspension limiter; and (b) a shock on a head gimbal assembly incorporating a suspension limiter according to the invention.
Figure 11B:
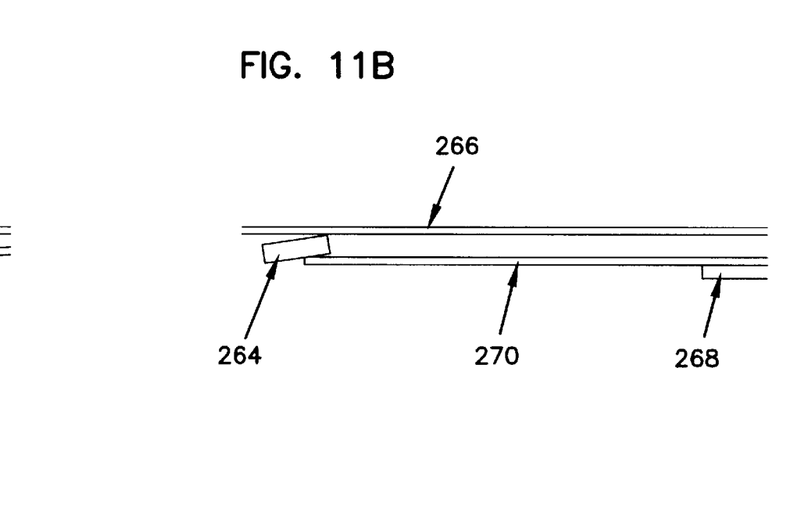

FIGS. 11*a–b* illustrate the results taken with a high speed camera of two identical shock experiments without and with a suspension limiter. In FIG. 11*a* no suspension limiter is used. The slider 260 is lifted off the surface of the disc 262 when a shock is delivered to the disc drive. FIG. 11*b* shows what happens when a shock is delivered to the disc drive when a suspension limiter according to the present invention is used. In FIG. 11*b* the slider 264 has barely started to lift off the surface of the disc 266. The suspension limiter 268 has prevented further lift off by its contact with the load beam 270.

Figure 12:
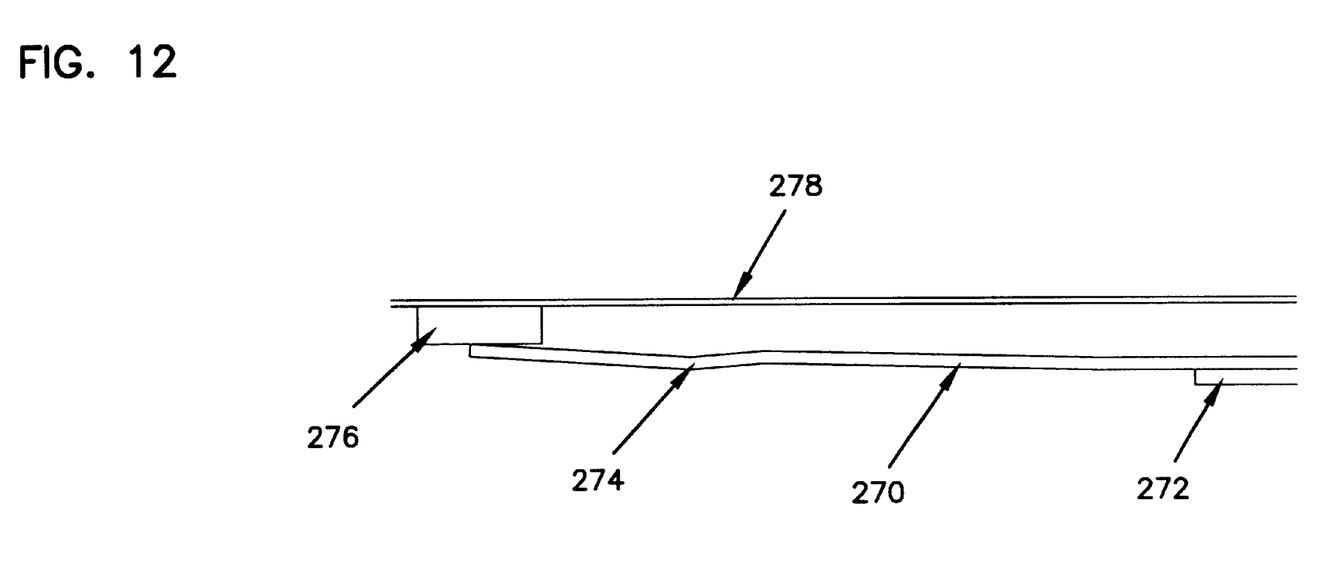
FIG. 12 is a side view of further results (taken from a high speed camera) of a shock on a head gimbal assembly with a suspension limiter.

FIG. 12 illustrates the results of another performed shock experiment. Again, this drawing was generated from a photograph taken by a high-speed camera when a suspension limiter according to the present invention was used. As can be seen from FIG. 12, the load beam 270 contacts suspension limiter 272 and deforms slightly at location 274. However, the slider 276 did not lift away from the disc 278.

In disc drives where tight tolerances are required (high-end drives), the suspension limiters have to be part of the base plate (same thickness). The thickness of the limiters is preferably between about 2 mil and 8 mil and is more preferably about 6 mil. The typical distance between adjacent load beams connected to the same actuator arm is 19 mil. Therefore, as shown in FIG. 4, with 1 mil tolerance between the suspension limiter and the FOS, there are still 5 mils clearance between the two suspension limiters 156 and 158. Note that manufacture is therefore feasible because manufacturing tolerances are currently 1 mil.

Figure 13:
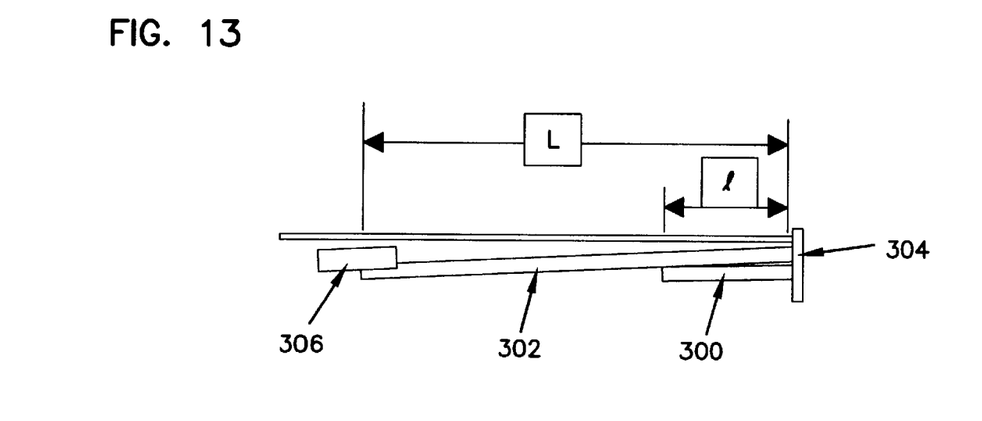
FIG. 13 is a beam drawing of a simple quasistatic tolerance model for modeling the interaction between a suspension limiter and a load beam.

FIG. 13 illustrates a simple linear quasistatic tolerance model, showing that with current manufacturing/assembly tolerances, the suspension limiter prevents severe head slap. A head slap is considered "severe" when the lift off distance (the distance between the disc and the transducer) is more than 5 mils. This model assumes a 1 mil gap between the suspension limiter 300 and the load beam 302. Furthermore, the model assumes a length "L" from the proximal end of the actuator arm 304 to the transducer 306 and a length "1" from the end of the actuator arm 304 to the distal end of the suspension limiter 300. The table below shows the calculated head lift off distances needed before the suspension limiter 300 is engaged.

| 1/L | Transducer lift off distance(mils) |
| --- | --- |
| 0.5 | 2.0 |
| 0.4 | 2.5 |
| 0.3 | 3.3 |
| 0.2 | 5.0 |

From the analysis above it is clear that the minimum length of the suspension limiter 300 should be 0.3L. Also, with better manufacturing tolerances, the distance between the suspension limiter 300 and the load beam 302 can be further reduced thus further reducing the head lift off distance before limiter engagement.

To summarize exemplary embodiments of the invention there is provided a head gimbal assembly (122, 178, 183, 206, 221) for attachment to an actuator arm (120, 160, 181, 210, 224, 304) of a disc drive (100). The head gimbal assembly includes a load beam (124, 166, 168, 184, 202, 226, 234, 251, 270, 302), wherein the proximal end of the load beam is operatively coupled to the actuator arm and the distal end of the load beam is operatively coupled to a gimbal assembly (136) wherein the gimbal assembly supports a transducer head (138, 186). The head gimbal assembly includes a stop means (130, 156, 164, 182, 212, 222, 230, 254, 268, 272, 300) operatively coupled to the actuator arm and adjacent to but not normally in contact with the load beam for limiting the motion of the load beam when the head gimbal assembly is subjected to shock.

In another exemplary embodiment of the invention there is provided a head gimbal assembly (122, 178, 183, 206, 221) for attachment to an actuator arm (120, 160, 181, 210, 224, 304) of a disc drive (100) and for supporting a flying head transducer (138, 186). The head gimbal assembly includes a load beam (124, 166, 168, 184, 202, 226, 234, 251, 270, 302) having a proximal end operatively coupled to the actuator arm and a distal end operatively coupled to a gimbal assembly (136) which supports the transducer head. The head gimbal assembly includes a suspension limiter (130, 156, 164, 182, 212, 222, 230, 254, 268, 272, 300) having aproximal end operatively coupled to the actuator arm and a distal end located adjacent to the load beam but normally not in contact with the load beam.

In another exemplary embodiment of the invention there is provided a magnetic disc drive (100) which includes a disc (102, 252, 262, 278) and a head stack assembly (108), the head stack assembly including a coil, an actuator body, and a plurality of actuator arms (120, 160, 181, 210, 224, 304). The magnetic disc drive further includes a plurality of head gimbal assemblies (122, 178, 183, 206, 221) operatively coupled to the plurality of actuator arms, each head gimbal assembly including a load beam (124, 166, 168, 184, 202, 226, 234, 251, 270, 302), wherein the proximal end of the load beam is operatively coupled to the actuator arm and the distal end is operatively coupled to a gimbal assembly (136) which supports a transducer head (138, 186). A proximal end of a suspension limiter (130, 156, 164, 182, 212, 222, 230, 254, 268, 272, 300) is operatively coupled to the actuator arm and a distal end is located adjacent to the load beam but normally not in contact with the load beam.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A head suspension assembly for attachment to an actuator arm of a disc drive and for supporting a flying head transducer over a surface of a disc, the head suspension assembly comprising:
   a load beam having a proximal end and a distal end wherein the proximal end of the load beam is operatively coupled to the actuator arm and the distal end of the load beam is operatively coupled to a gimbal assembly wherein the gimbal assembly supports a transducer head; and
   a stop member extending above and substantially parallel to the load beam short of a position of the gimbal assembly, wherein the stop member is an integral part of a base plate, the stop member operatively coupled to the actuator arm through a swaging boss of the base plate to directly contact the load beam and limit the motion of the load beam when the head suspension assembly is subjected to severe shock, wherein there is a gap between the stop member and the load beam in the absence of shock to the head suspension assembly.

2. The head suspension assembly of claim 1 wherein the base plate is swaged to the actuator arm on a side where the transducer is located.

3. The head suspension assembly of claim 1 wherein the base plate is swaged to the actuator arm on a side opposite from where the transducer is located.

4. The head suspension assembly of claim 1, wherein the stop member includes a bump member for increasing shock absorption of the stop member.

5. The head suspension assembly of claim 1 wherein a cushioning material is attached to the stop member and located on a side opposite the load beam.

6. The head suspension assembly of claim 1 wherein the stop member is a same cross sectional thickness as the actuator arm.

7. The head suspension assembly of claim 1 wherein the stop member is a smaller cross sectional thickness than the actuator arm.

8. The head suspension assembly of claim 7 wherein the stop member is a smaller width in a direction perpendicular to the cross sectional thickness of the actuator arm.

9. The head suspension assembly of claim 7 wherein the stop member is a same width in a direction perpendicular to the cross sectional thickness of the actuator arm.

10. A magnetic disc drive having a disc and having a head stack assembly, the head stack assembly including a coil, an actuator body, and a plurality of actuator arms, the magnetic disc drive further having a plurality of head suspension assemblies operatively coupled to the plurality of actuator arms, each head suspension assembly comprising:

a load beam having a proximal end and a distal end wherein the proximal end of the load beam is operatively coupled to the actuator arm;

a gimbal assembly operatively coupled to the distal end of the load beam wherein the gimbal assembly supports a transducer head; and a suspension limiter extending along and substantially parallel to the load beam short of the gimbal assembly position, wherein the suspension limiter is an integral part of a base plate, having a proximal end operatively coupled to the actuator arm through the base plate and a distal end located adjacent to the load beam wherein there is a gap between the distal end of the suspension limiter and the load beam in the absence of shock to the disc drive and wherein the suspension limiter directly contacts the load beam to limit the movement of the load beam under shock conditions.

11. The magnetic disc drive of claim 10 wherein the base plate is connected to the actuator arm on a side opposite from where the transducer head is located.

12. The magnetic disc drive of claim 10 wherein the base plate is connected to the actuator arm on a side where the transducer head is located.

13. The magnetic disc drive of claim 10 wherein the suspension limiter includes a bump for increasing shock absorption of the suspension limiter.

14. The magnetic disc drive of claim 10 wherein a cushioning material is located between the suspension limiter and an adjacent suspension limiter utilized in an adjacent head suspension assembly.

15. A head suspension assembly for attachment to an actuator arm of a disc drive and for supporting a flying head transducer over a surface of a disc, the head suspension assembly comprising:

a load beam having a proximal end and a distal end wherein the proximal end of the load beam is operatively coupled to the actuator arm and the distal end of the load beam is operatively coupled to a gimbal assembly wherein the gimbal assembly supports a transducer head;

a stop member extending above the load beam short of a position of the gimbal assembly, wherein the stop member is an integral part of a base plate, the stop member operatively coupled to the actuator arm through a swaging boss of the base plate for limiting the motion of the load beam when the head suspension assembly is subjected to severe shock, wherein there is a gap between the stop member and the load beam in the absence of shock to the head suspension assembly; and a cushioning material attached to the stop member and located on a side opposite the load beam.

16. The head suspension assembly of claim 15 wherein the base plate is swaged to the actuator arm on a side where the transducer is located.

17. The head suspension assembly of claim 15 wherein the base plate is swaged to the actuator arm on a side opposite from where the transducer is located.

18. The head suspension assembly of claim 15, wherein the stop member includes a bump member for increasing shock absorption of the stop member.

19. The head suspension assembly of claim 15 wherein the stop member is a same cross sectional thickness as the actuator arm.

20. The head suspension assembly of claim 15 wherein the stop member is a smaller cross sectional thickness than the actuator arm.

21. The head suspension assembly of claim 20 wherein the stop member is a smaller width in a direction perpendicular to the cross sectional thickness of the actuator arm.

22. The head suspension assembly of claim 20 wherein the stop member is a same width in a direction perpendicular to the cross sectional thickness of the actuator arm.

* * * * *